US012752764B2

(12) United States Patent
Neu et al.

(10) Patent No.: US 12,752,764 B2
(45) Date of Patent: Oct. 6, 2026

(54) METHOD FOR CHECKING THE FUNCTIONALITY OF AN ACTUATING UNIT, AND ACTUATING UNIT

(71) Applicant: Continental Automotive Technologies GmbH, Hannover (DE)

(72) Inventors: Andreas Neu, Kuhardt (DE); Christian Courth, Frankfurt (DE); Robert Schmidt, Rennerod (DE); Sébastien Pla, Darmstadt (DE); Bartosz Maj, Frankfurt am Main (DE); Dirk Morschel, Ober-Mörlen (DE)

(73) Assignee: AUMOVIO Germany GmbH, Frankfurt am Main (DE)

( * ) Notice: Subject to any disclaimer, the term of this patent is extended or adjusted under 35 U.S.C. 154(b) by 16 days.

(21) Appl. No.: 19/071,516

(22) Filed: Mar. 5, 2025

(65) Prior Publication Data

US 2025/0282339 A1 Sep. 11, 2025

(30) Foreign Application Priority Data

Mar. 6, 2024 (DE) ..................... 10 2024 202 102.4

(51) Int. Cl.
*B60T 17/22* (2006.01)
*F16D 65/16* (2006.01)
*F16D 121/20* (2012.01)

(52) U.S. Cl.
CPC .............. *B60T 17/22* (2013.01); *F16D 65/16* (2013.01); *F16D 2121/20* (2013.01)

(58) Field of Classification Search
CPC ...... B60T 17/22; B60T 13/741; B60T 13/746; B60T 13/748; B60T 17/221; B60T 13/74; F16D 65/16; F16D 2121/20; F16D 63/006
See application file for complete search history.

(56) References Cited

U.S. PATENT DOCUMENTS

2007/0058321 A1* 3/2007 Asano ....................... F01L 9/20 361/160

FOREIGN PATENT DOCUMENTS

| | | | |
|---|---|---|---|
| DE | 4118975 | A1 | 12/1992 |
| DE | 102009018122 | A1 | 10/2010 |
| DE | 102017206798 | A1 | 10/2018 |
| DE | 102021209291 | A1 | 3/2023 |

OTHER PUBLICATIONS

German Search Report dated Jan. 7, 2025 for the priority German Patent Application No. 10 2024 202 102.4.

* cited by examiner

*Primary Examiner* — Xiao En Mo

(57) ABSTRACT

An actuating unit and a method for checking the functionality of an actuating unit comprising applying a current level corresponding at least to a magnitude of a holding current to an electromagnet, gradually changing the holding current, detecting current flowing through the electromagnet during and/or after the change in the holding current, deriving the inductance from the change in the current profile, and comparing the inductance with an inductance characteristic curve stored in a non-volatile memory. The actuating unit comprises a sliding element or blocking slide.

15 Claims, 5 Drawing Sheets

METHOD FOR CHECKING THE FUNCTIONALITY OF AN ACTUATING UNIT, AND ACTUATING UNIT

TECHNICAL FIELD

A method for checking the functionality of an actuating unit, and an actuating unit of corresponding design is described herein.

BACKGROUND

Electrically actuable motor vehicle brakes, also referred to as electromechanical motor vehicle brakes, are increasingly being used as brake systems for motor vehicles. These motor vehicle brakes offer a number of differences over conventional, hydraulically actuable wheel brakes. For example, there is no longer any need for a complex hydraulics system, and an electromechanical wheel brake also takes up significantly less space.

Electromechanical wheel brakes of this kind typically have an electric or electronic drive unit, which interacts with a mechanism or a transmission. A braking unit can then be arranged on the output side, and this can comprise a brake part with a friction lining, and the brake part can be pressed onto or against a brake disk or drum by means of a translational movement. It is thereby possible to bring about deceleration during operation.

Electromechanical wheel brakes can be designed as service brakes. The transmission is not designed to be self-locking here, in order to allow emergency brake release and to prevent an undesired braking action in the event of a power failure.

In wheel brakes of this kind, the function of the parking brake can be implemented by blocking the transmission. Currentless locking of the parking brake can be carried out, for example, by an electromagnetic actuator, which can move a sliding element or a blocking slide into a blocking position in order to lock a transmission in this way and implement a parking brake function.

In this case, the sliding element can engage, for example, into a structured surface of a shaft, as a result of which the movement of the structured surface can be prevented in at least one direction. This can prevent rotation of the shaft, and the associated wheel brake can be kept in this blocked state or state in which the brake is applied. A method for operating a blocking slide of this kind is known. The method allows monitoring of the blocking slide to determine whether the blocking slide has reached the blocking position during operation.

Establishing whether the sliding element has also reached the desired position takes place here during operation, i.e. given corresponding actuation after start of travel. However, in the event of a fault or defect, the blocking position may not be reached as desired.

Therefore, it is desirable to be able to check as early as before possible start of travel whether the parking brake function is properly and fully available.

SUMMARY

It is therefore an object to provide a method for checking the functionality of an actuating unit, which method, in comparison to known embodiments, also allows proactive checking of the actuating unit, for example a parking brake function of an electromechanical motor vehicle brake. A further object is to provide an actuating unit of this kind, for example for a parking brake function of an electromechanical motor vehicle brake, for executing such a method.

This object is achieved by a method for checking the functionality of an actuating unit, a correspondingly designed actuating unit and a brake system for a motor vehicle comprising an actuating unit of this kind.

A firstaspect, relates to a method for checking the functionality of an actuating unit, wherein the actuating unit comprises:

- a sliding element,
- an electromagnet and
- a spring, wherein
- the sliding element can be moved from a first starting position to a second actuating position by switching on a supply voltage for applying a predetermined current level to the electromagnet.

The method may comprise the steps mentioned below:

- applying a current level corresponding at least to the magnitude of a holding current to the electromagnet,
- gradually changing the holding current,
- detecting the current flowing through the electromagnet during and/or after the change in the holding current,
- deriving the inductance from the change in the current profile, and
- comparing the inductance with an inductance characteristic curve stored in a non-volatile memory.

The method may be carried out when the sliding element is in the actuating position. Therefore, according to an embodiment, provision may be made for the method to further comprise at least the following step, for example when the sliding element is still in the starting position at the beginning of the method

- moving the sliding element from the starting position to the actuating position beforehand, wherein electric current of a current level corresponding at least to the magnitude of an activation current and the magnitude of the holding current is applied to the electromagnet.

The method can therefore be used independently of the current position of the sliding element, wherein in the case of a position of the sliding element in the starting position, the additional abovementioned method step can be used. In order to move the sliding element, the supply voltage can be applied, wherein the current level may comprise both the components of the activation current and of the holding current, which will be discussed in more detail further below. In a further aspect, also relates to a method for operating an actuating unit, wherein the functionality of the actuating unit is checked before actuation, wherein a method for checking the functionality of the actuating unit as described above is employed. In a yet further aspect, an actuating unit comprises

- a sliding element,
- an electromagnet and
- a spring, wherein
- the sliding element can be moved from a first starting position to a second actuating position by switching on a supply voltage of the electromagnet.

Finally, a further aspect relates to a brake system for a motor vehicle, comprising at least one actuating unit as presented above. The actuating unit may be, for example, a constituent part of an electromechanically actuable wheel brake and used, for example, for a parking brake.

For the purposes of the embodiments, a motor vehicle may refer to a vehicle having axles, wherein at least one of these axles can comprise steerably guided wheels and, in addition, driving of the wheels of at least one axle can be adapted in a wheel-specific manner.

The electromechanically actuable wheel brakes can be embodied as electromechanical disk brakes, in which a clamping force or brake application force can be produced by means of an electric motor, an auxiliary transmission and/or a rotation-translation mechanism. In this context, the brake application force refers to the force with which the brake linings are pressed against the brake disk. During operation, a corresponding braking torque is then produced at the wheel under consideration in this way. Depending on the embodiment and control concept, the control system can be selected in such a way that either a specified, defined clamping force or a specified, defined braking torque is set in accordance with the deceleration demand requested.

The electromechanically actuable wheel brakes can also be designed as an electromechanical drum brake, in which the motor/transmission unit actuates an expansion module, which presses the brake linings against the brake drum with an expansion force specified on the basis of the desired deceleration requested and thus produces a corresponding braking torque. Depending on the embodiment and control concept, the control system can be designed in such a way that a defined expansion force or a defined braking torque is set in accordance with the deceleration demand.

The actuating unit may be integrated here into a parking brake unit, which can therefore be a constituent part of the electromechanically actuable wheel brake. The parking brake unit can be provided to allow the motor vehicle to be stopped. The parking brake unit comprising the actuating unit can be integrated both into an electromechanical drum brake and also into an electromechanical disk brake.

The embodiments allow checking of the functionality of the actuating unit at a predetermined time. for example, before actual operation of the actuating unit, a check may be performed in order to ensure that, in the case of subsequent intended use of the actuating unit, said actuating unit is fully functional. This is useful in conjunction with a brake system for a motor vehicle since important and safety-relevant properties of the brake system can be checked as early as before or during start of travel. Therefore, for example, before the start of travel, the method can be used to check whether the actuating unit for actuating a parking brake in the motor vehicle is fully available.

The sliding element can be moved from a first position, which can represent a starting position, to a second position, which can represent an actuating position. At least the electromagnet may be provided for moving purposes. By switching on a supply voltage of the electromagnet, the sliding element can be moved, wherein electric current of a predetermined current level can be applied to the electromagnet.

According to the embodiments, means can be provided which can hold the sliding element in the starting position. These means can comprise, for example, a spring, for example a compression spring, which in the starting position can be relaxed and firmly hold the sliding element. When the supply voltage is applied to the electromagnet, the electromagnet can be designed to apply a force component which may exceed this holding force in the starting position and thus move the sliding element in the desired direction. The spring can be tensioned in the actuating position.

According to an embodiment, the sliding element can be moved in a translational manner from the starting position to the actuating position. In principle, other forms of movement are also possible, such as pivoting. However, a primarily linear movement appears to be technically easier to implement and may be suitable for the intended use, for example for a parking brake.

The sliding element can be designed as a blocking slide or comprise a blocking slide. A blocking slide may be, for example, a slide which can be moved along one direction and the opposite direction. It may therefore involve, for example, one-dimensional actuability and/or mobility.

For example, the electromagnet can generate a magnetic field in order to deliberately move the sliding element to a specific position. Accordingly, the sliding element may be formed with at least one magnet, for example a permanent magnet or an electromagnet, or from a magnetically effective material, so that actuation by an electromagnet is possible.

The sliding element can engage into a structured surface, for example formed on a shaft, or into a ratchet wheel, which is connected to the shaft for conjoint rotation, in the actuating position. The structured surface can be, for example, a surface which has suitable structures, such as projections, recesses or notches for example, in order to achieve the desired effect when the sliding element engages. The movement can be prevented for example in one direction or else in more, e.g. two, directions.

If the structured surface is formed on a rotating object, such as a shaft for example, or comprises a ratchet wheel, which is connected to a shaft for conjoint rotation, rotation of the shaft in one direction or else in both directions can be prevented. The actuating position can accordingly represent a blocking or locking position, in which the shaft can be prevented from rotating.

The method for checking the functionality of the actuating unit can comprise a multi-stage process. The functionality checking can be carried out at a predetermined time or else repeatedly. Since the checking may result in movement of the sliding element, it is expediently carried out at a time at which the actuating unit is not in regular use or regular use is not expected, or generally at a time at which the actuation cannot be detrimental. If the actuating unit is used, for example, for or together with a parking brake, execution of the checking method may be difficult when the associated motor vehicle is in motion.

However, a useful time may be, for example, at the beginning of travel or before the start of travel in the case of an actuating unit when the actuating unit is used in conjunction with a brake system. The checking can also be repeated, for example at specific intervals, when the control unit is not in operation. The checking can also take place immediately before planned operation of the actuating unit and thus represent the first step of actuation as it were. This ensures with a high degree of reliability that the actuating unit is functional when it is needed.

Checking the functionality of the actuating unit can comprise several steps, which may be executed in succession. In a first step, provision may be made, starting from a sliding element in the starting position, to apply a supply voltage to the electromagnet, wherein the current level can be composed of an activation current and a holding current. This allows the holding force of the spring to be overcome and the sliding element to be moved from the starting position to the actuating position. Known parameters, for example the time for the movement with which the sliding element reaches the intended actuating position when the actuating unit is fully functional, can be taken as a basis for controlling said movement.

As soon as the sliding element has reached the intended actuating position, the current level can be reduced in a further step. This can be achieved according to an embodiment in that the current level is reduced to the holding current and the activation current is dispensed with.

Holding current accordingly refers to a current level at which a holding force corresponding at least to the holding force of the spring can be applied to the sliding element by the electromagnet. The holding force produced by the holding current can also slightly exceed the holding force of the spring. A fully or regularly functional spring may be assumed here. In the case of a functioning actuating unit, this leads to the sliding element being able to be held in the actuating position.

Activation current accordingly refers to a magnitude of a current level which is added additionally to the holding current in order to cause the movement of the sliding element. The magnitude of the current level in this step can accordingly correspond to the magnitude of the holding current and additionally the magnitude of the activation current. The corresponding magnitudes for the holding current and the activation current can be stored in the controller for this purpose.

The supply voltage applied to the electromagnet typically results in a current flow that can be detected. A current sensor, for example, can be used for this purpose. The embodiments, however, make use of the finding that the functionality of the actuating unit and for example of the spring can be inferred from the change in the current flow given different, defined movements or changes in position of the sliding element and comparison with stored characteristic curves. The functionality of an actuating unit can be checked, for example, in such a way that the current flow is monitored for a specific pattern and/or for the specific threshold or limit values being exceeded or undershot.

For example, a drop in current can be identified by way of a time interval after switching on the supply voltage. This may be a typical functionality of a specific arrangement, wherein the controller may be configured to identify such a drop. Typically, the magnetic field is first built up before the drop, with an inductance of the electromagnet counteracting the increase in current. The drop in current typically characterizes the point in time starting from which the sliding element actually moves. After the drop in current, an increase in current can be detected, for example. This increase is typically already the second increase starting from the supply voltage being switched on. Such an increase in current, which occurs after a drop, typically characterizes a point starting from which the sliding element has arrived at its end position. For example, the situation of the actuating position having been properly reached can be identified when a transition between a drop in current and an increase in current takes place in a specified time interval after switching on the supply voltage. This transition is, for example, the increase after the drop in current. If this takes place in a specified time interval, this indicates that the sliding element has been moved to the actuating position as desired and has not, for example, previously encountered an unexpected obstacle or become stuck and not reached the actuating position.

This allows proper locking to be identified when the time derivative lies within a specified range. Here, proper locking means that the sliding element correctly reaches the actuating position. This time derivative typically characterizes an inductance of the electromagnet in specific positions of the sliding element, for example an extended sliding element. This inductance is typically higher than the inductance when the electromagnet is retracted, which is why the increase in current is slower. The current can be derived with respect to time for example numerically or else analytically. For example, this time derivative can be measured immediately after an increase in current is identified. Said time derivative can be determined, for example, by a change in current being measured in a specified time. Said time derivative can also be determined by a time required for a specified change in current to be measured. The time derivative is, for example, a time derivative.

Actually checking the functionality of the actuating unit can comprise the steps

- changing the holding current,
- detecting the current,
- deriving the inductance and/or
- comparing the inductance with an inductance characteristic curve
- and form a checking cycle in this order. This checking cycle can be run through several times to check the functionality of the actuating unit. This allows the holding current to be changed with each run and the effects on the inductance to be analyzed in order to establish in this way whether the actuating unit is fully functional. Successive checking cycles can therefore be performed with different holding currents, wherein the changes can be checked for the inductance. Possible faults can be identified in this way.

After each change in the holding current, the current flowing through the electromagnet during and/or after the change in the holding current can be detected or measured. In order to avoid a sensor, a current and/or voltage profile can be observed as outlined above, for example.

This can be done, for example, at high frequency, for example with a monitoring frequency of at least 5 kHz and/or at most 15 kHz, or 10 kHz. Other values can also be used. Deviations in the movement sequence can be identified via the current curve shape. For this purpose, for example, current gradients, which represent a current increase for example, can be formed, which characterize the inductance when voltage is known.

The time derivative or the magnitude of the inductance after modifying the holding current can be compared with a predetermined range or profile, for example an inductance characteristic curve, which can be stored in a non-volatile memory of the controller. In other words, the inductance can be calculated by taking into consideration the time shift between the current and the voltage. If the derived magnitude for the inductance deviates from the stored inductance curve for example by a predetermined value, it can be inferred that the sliding element is not in the intended position.

According to an embodiment, it may be provided that a corresponding fault message is issued by the controller if the deviations are too large. For example, a fault message can be used to warn a driver and to request that the vehicle be secured in some other way and/or a visit to a workshop be arranged.

The controller may be integrated into the actuating unit, or else, for example, into a superordinate vehicle controller or into a brake control device.

According to an embodiment, changing the holding current may comprise brief, for example pulsed, stopping of the holding current at the specific current level or at a constant current level. For example, if the supply voltage is applied with pulse-width modulation, the supply voltage can be switched off for the duration of each test pulse.

One development can provide that, in a subsequent checking cycle, the number of test pulses with stopping of the supply voltage is increased compared to the number of test pulses in the previous checking cycle. In this way, a check can be performed, for example, as to how strong the return force provided by the spring still is when the time intervals in which the supply voltage is stopped and accordingly no holding current is applied to the electromagnet are gradually increased.

According to a further embodiment, changing the holding current can involve gradually reducing the holding current, so that the current level in the subsequent checking cycle is lower than in the previous checking cycle. By gradually changing the holding current, the holding force is gradually changed by the electromagnet, while the return force provided by the spring remains unchanged if the spring is functioning properly.

For example, the holding current can be reduced in small steps, wherein the holding current—starting from the starting value for the current level-is reduced by a predetermined amount for each subsequent step. It is possible to check how strong the return force provided by the spring still is in this way too. Therefore, for example, a specific holding current can be specified, starting from which the sliding element should be able to be moved back to the starting position by the spring.

The method thus allows verification that the unlocking took place from the locked position or that the locking took place from the unlocked position.

The embodiments also allow a check to be made as to whether the locking mechanism is held in its respective desired position with the intended holding force. Owing to the safety relevance of the wheel brake, the risk of unintentional locking due to insufficient holding or return forces provided by the spring can be largely precluded in this way. This means that a potential hazard due to a faulty parking brake can be identified even before it occurs.

The method allows monitoring when the vehicle is at a standstill and also during travel. Monitoring during travel is possible, for example, as long as the current remains so small that the locking mechanism does not move and thus the sliding element remains in the unlocked position.

In summary, position identification or else position confirmation of the requested positions is therefore possible. The movement of the locking mechanism or the sliding element can be monitored by evaluating "peaks" in the current and/or voltage profile, induced by the moving armature. The checking cycle allows permanent or cyclical or periodic, but also one-off, testing. The necessary current level can also be determined in order to maintain the requested end positions. It is also possible to determine the required spring force of the retaining spring.

The method is distinguished, among other things, in that it can be used in a cost-effective manner since no additional sensor system is required and the already existing hardware can be used. The locking mechanism or the sliding element can be monitored using existing hardware on the basis of electrical signals, so that an additional sensor system for monitoring can be dispensed with. The need for computing time is very low here and the process is comparatively robust. Therefore, for example, costly additional measures, for example to achieve a required 0 ppm fault protection on the spring, can be largely dispensed with, for example a 100% force test or vibration tests during series production. The method can be used, for example, on coils or magnetic actuators.

BRIEF DESCRIPTION OF THE DRAWINGS

Further details are clear from the description of the illustrated exemplary embodiments and the attached claims.

In the drawings.

DETAILED DESCRIPTION

In the following detailed description of embodiments, for the sake of clarity, the same reference signs designate substantially identical parts in or on these embodiments. However, for better clarification, the embodiments illustrated in the figures are not always drawn to scale.

Figure 1:
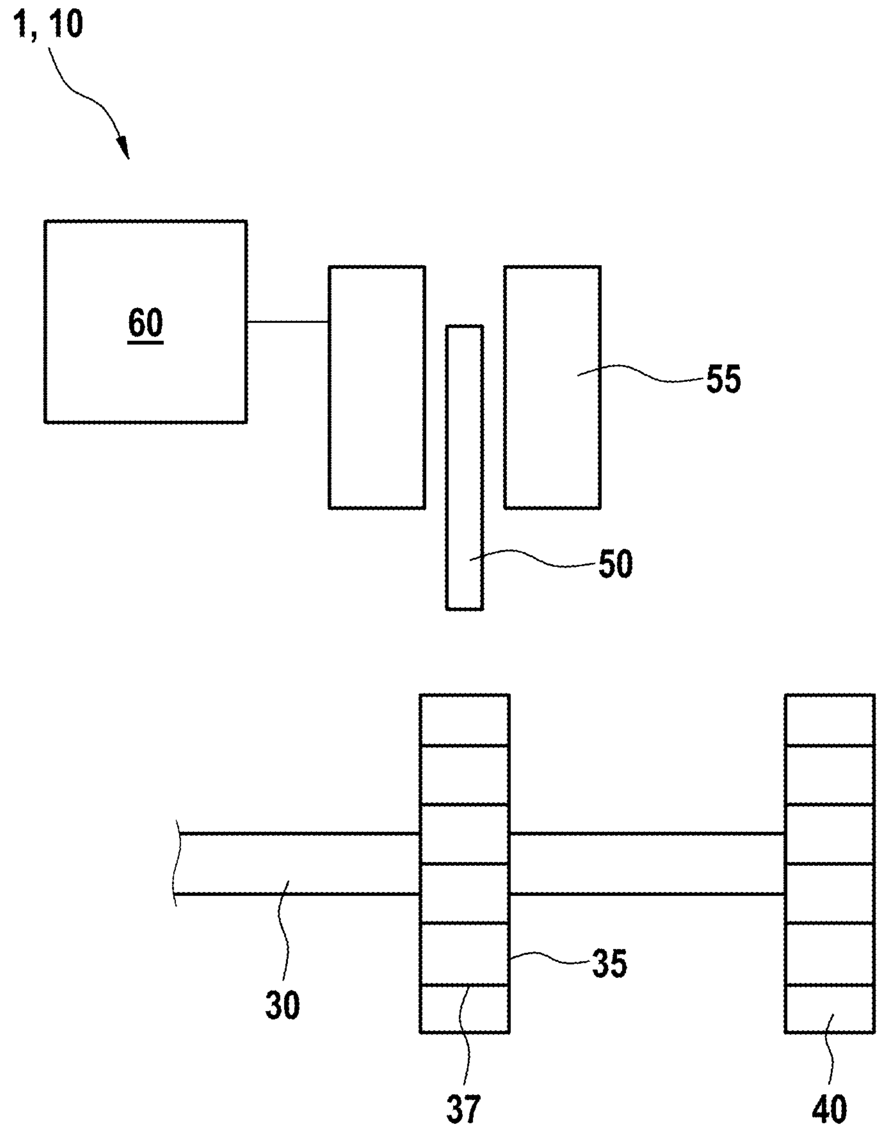
FIG. 1 shows a parking brake unit comprising an actuating unit.

FIG. 1 shows, purely schematically, a parking brake unit 1 comprising an actuating unit 10 according to an exemplary embodiment.

The parking brake unit 1 has a shaft 30, which can be driven by an electric motor or in some other way. A ratchet wheel 35, on the outside of which a structured surface 37 is formed, is mounted on the shaft 30 for conjoint rotation. The structured surface 37 faces outward and is connected to the shaft 30 for conjoint rotation via the ratchet wheel 35. The structured surface 37 may be, for example, a serrated surface, as in a gear, or a surface with bent projections and intermediate spaces therebetween.

If the structured surface is formed on a rotating object, such as a shaft for example, or comprises a ratchet wheel, which is connected to a shaft for conjoint rotation, rotation of the shaft in one direction or else in both directions can be prevented. The actuating position can accordingly represent a blocking position, in which the shaft can be prevented from rotating.

Reference sign 40 shows, purely by way of example, an output pinion, which can be rotationally connected to a unit that is not shown. For example, it can be rotationally connected to a rotation-translation mechanism, not shown, and thus ensure that an electrically actuated brake, such as a drum brake or a disk brake for example, can be actuated by means of the shaft 30.

A sliding element 50 is arranged adjacent to the ratchet wheel 35. This sliding element can be actuated, i.e. can be moved vertically in the illustration of FIG. 1, by means of an electromagnet 55. It is thus one-dimensionally linearly movable and accordingly mounted, with the mounting not being shown. The actuating unit 10 also has a controller 60, which is configured to execute the method.

Figure 2:
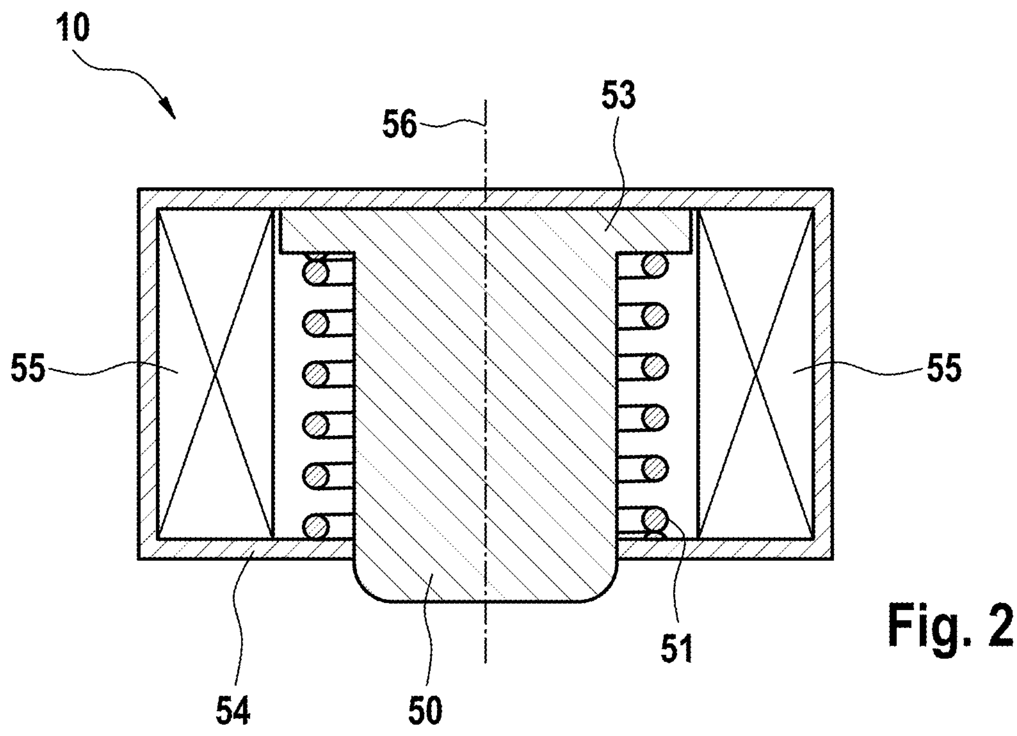
FIG. 2 schematically shows a sectional view of the actuating unit in a starting position, FIG. 3 schematically shows a sectional view of the actuating unit in an actuating position.
Figure 3:
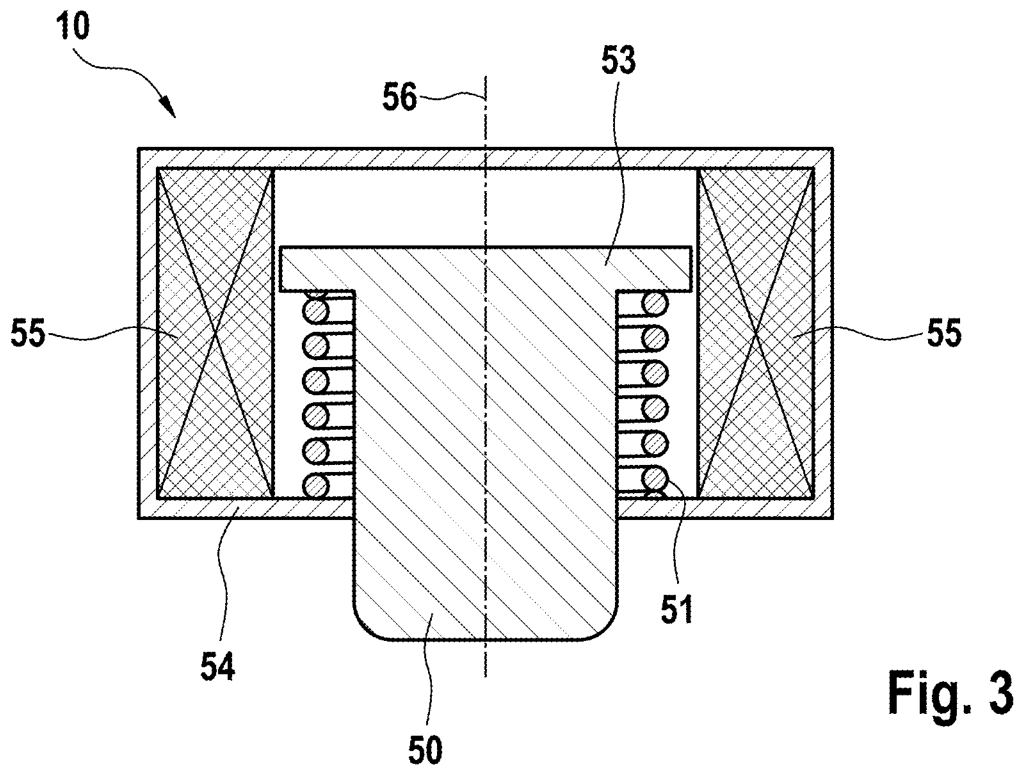

In addition to the sliding element 50 and the electromagnet 55, the actuating unit 10 also comprises a spring 51, which is not shown in FIG. 1 for the sake of clarity alone. FIGS. 2 and 3 schematically show a sectional view of the actuating unit 10, with the spring 51 also being shown in these illustrations. FIG. 2 shows the actuating unit 10 in the starting position, in which no locking is performed, and FIG. 3 shows the actuating unit 10 in the actuating position, in which the sliding element 50 engages into a structured surface 37, for example. The structured surface 37 is not shown in FIGS. 2 and 3.

The sliding element 50 can be moved from the starting position, as shown in FIG. 2, to the actuating position, as shown in FIG. 3, by switching on a supply voltage of the electromagnet 55. Electric current with a current level which is composed of an activation current and a holding current is applied to the electromagnet 55 here.

The method for checking the functionality of the actuating unit 10 runs through the steps mentioned below:

- applying a current level corresponding at least to the magnitude of a holding current to the electromagnet 55,
- gradually changing the holding current,
- detecting the current flowing through the electromagnet 55 during and/or after the change in the holding current,
- deriving the inductance from the change in the current profile, and
- comparing the inductance with an inductance characteristic curve stored in a non-volatile memory.

The embodiments also comprise an actuating unit 10, comprising

- a sliding element 50,
- an electromagnet 55 and
- a spring 51, wherein
- the sliding element 50 can be moved from the starting position to the actuating position by switching on a supply voltage of the electromagnet 55.

The embodiments also further comprise a brake system for a motor vehicle, comprising at least one actuating unit 10 as presented above. Here, the actuating unit 10 is, for example, a constituent part of an electromechanically actuable wheel brake. The electromechanically actuable wheel brakes can be designed as electromechanical disk brakes or else as electromechanical drum brakes. The actuating unit 10 is integrated here into the parking brake unit 1, which is therefore a constituent part of the electromechanically actuable wheel brake. The parking brake unit 1 is provided to allow the motor vehicle to be stopped.

When the sliding element 50 is in the starting position, it is provided according to an embodiment that, before the actual test cycle, the sliding element moves from the the starting position to the actuating position beforehand, wherein electric current of a current level corresponding at least to the magnitude of the activation current and the magnitude of the holding current is applied to the electromagnet 55. This allows the holding force of the spring 51 to be overcome and the sliding element 50 to be moved from the starting position to the actuating position.

As can be seen in FIG. 2, the spring 51 can hold the sliding element 50 in the starting position, wherein the spring 51 is relaxed. The spring 51 is designed as a compression spring here. When the supply voltage is applied to the electromagnet 55, the electromagnet is designed to apply a force component which exceeds this holding force in the starting position and thus moves the sliding element 50 in the desired direction. The spring 51, as shown in FIG. 3, is tensioned in the actuating position. The movement of the sliding element 50 is translational. As can be seen in FIGS. 2 and 3, the sliding element is designed as a blocking slide.

The electromagnet 55 is designed to generate a magnetic field when the supply voltage is applied to it. For this purpose, the sliding element 50 has at least one magnet, for example a permanent magnet or an electromagnet, or a magnetically effective material, so that movement by the electromagnet 55 is possible.

When the sliding element 50 has reached the intended actuating position, the current level is reduced in a further step. Here, the holding current remains the same, and the current level is reduced by the amount of the activation current component. The corresponding magnitudes for the holding current and the activation current are stored in the controller 60.

According to an embodiment, the checking cycle begins when the sliding element 50 is in the actuating position. The checking cycle may also be used or repeated when the sliding element 50 is in the actuating position, for example during relatively long-lasting locking.

The checking cycle provides for gradually changing the holding current. After each change in the holding current, the current flowing through the electromagnet during and/or after the change in the holding current can be detected or measured. Monitoring is performed at high frequency with a monitoring frequency of at least 5 kHz. Deviations in the movement sequence are identified by the controller via the current curve shape. For this purpose, for example, current gradients, which represent a current increase for example, can be formed, which characterize the inductance when voltage is known.

The time derivative or the magnitude of the inductance after a change in the holding current is compared with a predetermined range or profile, for example an inductance characteristic curve, which is stored in a non-volatile memory of the controller. If the inductance deviates from the stored inductance curve, for example by a predetermined value, it can be inferred that the sliding element 50 is not in the intended position.

According to the illustrated exemplary embodiment, it is provided that a corresponding fault message is issued by the controller when the deviation in the inductance from the inductance characteristic curve deviates by a value which is greater than a predetermined limit value, or a predetermined threshold is exceeded. For example, a fault message can be used to warn a driver and to request that the vehicle be secured in some other way and/or a visit to a workshop be arranged.

The controller is functionally integrated into the actuating unit here, but may also be integrated, for example, into a superordinate vehicle controller or into a brake control device.

The checking cycle accordingly comprises at least the following steps

- changing the holding current,
- detecting the current,
- deriving the inductance and/or
- comparing the inductance with an inductance characteristic curve.

This checking cycle is run through several times to check the functionality of the actuating unit. This allows the holding current to be changed with each run and the effects on the inductance to be analyzed in order to establish in this way whether the actuating unit is fully functional. Successive checking cycles can therefore be performed with different holding currents, wherein the changes can be checked for the inductance.

According to an embodiment, changing the holding current comprises brief stopping of the holding current at the specific current level. For example, if the supply voltage is applied with pulse-width modulation, the supply voltage can be switched off for the duration of each test pulse or in a pulsed manner. Such a test pulse can last for, for example, less than 10 000 μs, e.g. less than 1000 μs and or less than 700 μs, so that a corresponding checking cycle can be run through very quickly.

One development can provide that, in a subsequent checking cycle, the number of test pulses with stopping of the supply voltage is increased compared to the number of test pulses in the previous checking cycle. Therefore, in a first run of the checking cycle, the supply voltage can only be switched off for one test pulse, in the following run for two test pulses and then for three test pulses etc. In this way, a check can be performed, for example, as to how strong the return force provided by the spring still is when the time intervals in which the supply voltage is stopped and accordingly no holding current is applied to the electromagnet 55 are gradually increased.

According to a further embodiment, changing the holding current can involve gradually reducing the holding current, so that the current level in the subsequent checking cycle is lower than in the previous checking cycle. By gradually changing the holding current, the holding force is gradually changed, for example reduced, by the electromagnet 55, while the return force provided by the spring 51 remains unchanged if the spring 51 is functioning properly. The current level of the holding current can be kept very low overall and, for example, at the beginning of the checking cycle can be less than 5000 mA, e.g. less than 3000 mA and for example less than 2500 mA. For example, the holding current can be reduced in small steps, wherein the holding current—starting from the starting value for the current level-is reduced, for example, by 1%, 2% or 5% for each subsequent step. It is possible to check how strong the return force provided by the spring still is in this way too. Therefore, for example, a specific holding current can be specified, starting from which the sliding element should be able to be moved back to the starting position by the spring.

Figure 4:
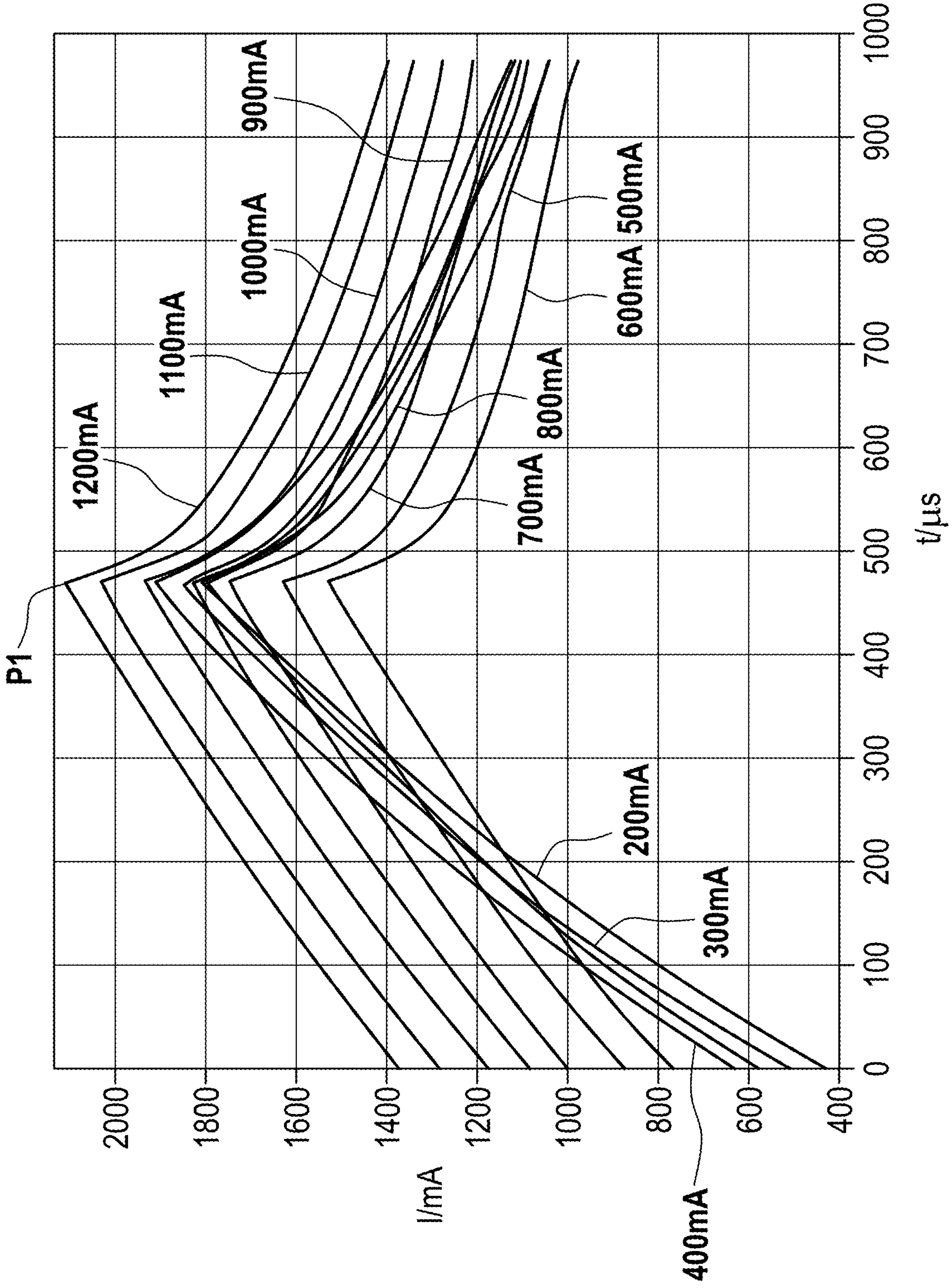
FIGS. 4 shows, by way of example, different current profiles over time at different current levels.

FIG. 4 shows, by way of example, different current profiles over time at different current levels.

Point P1, plotted merely by way of example for the current level 1200 mA in the example, indicates the maximum current at the time at which the supply voltage is switched off. The different current profiles or sets of curves show that there is a steeper or less steep increase in current for one end position, for example when switching on the supply voltage, depending on the position. The steepness is directly linked with the inductance. For example, the steep increases indicate smaller inductances and thus the starting position, and the less steep increases indicate the higher inductance and the actuating position. In other words, FIG. 4 shows two groups of lines or sets of curves, which clearly identifiably have a different gradient, for example in the increasing portion. This gradient is directly correlated with the inductance.

Figure 5:
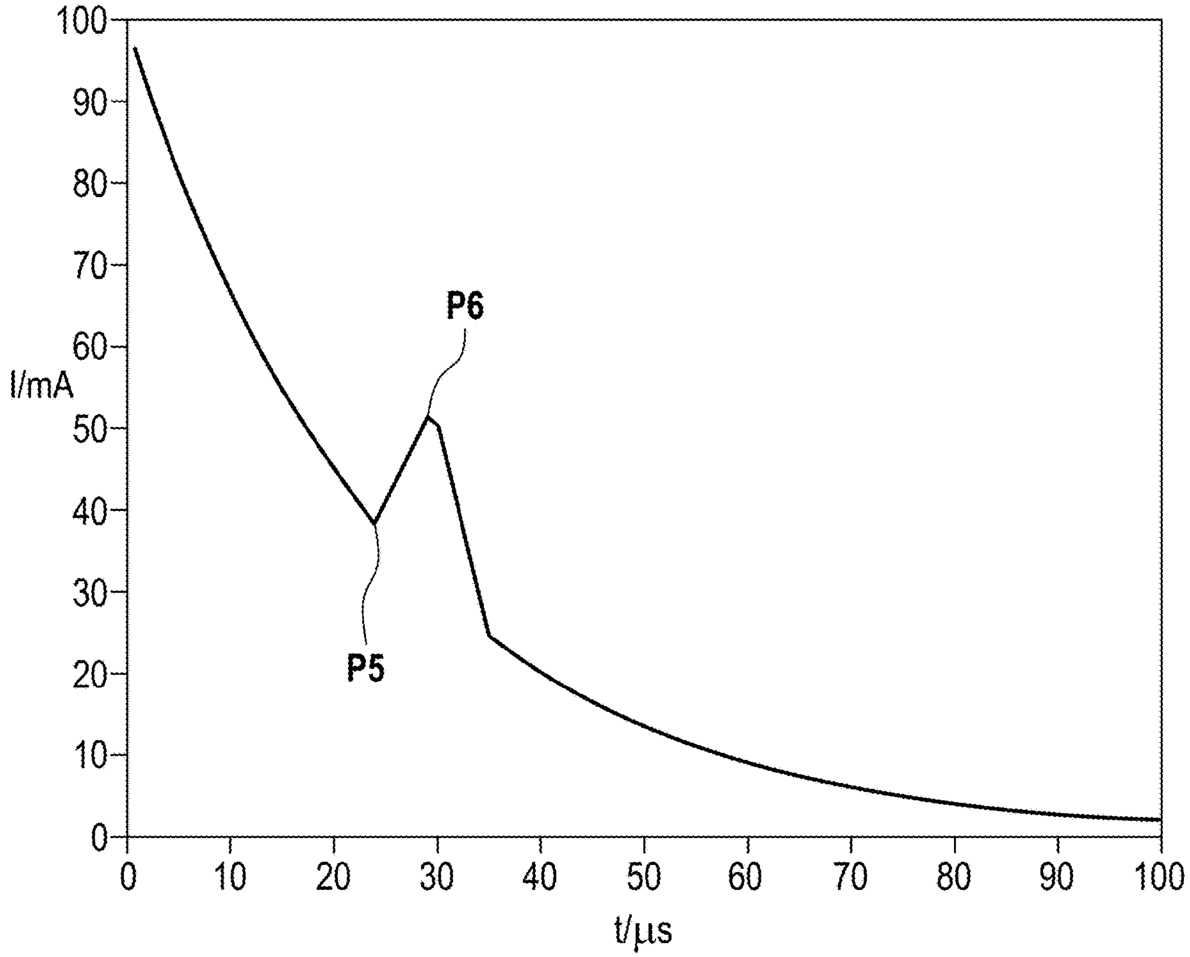
FIG. 5 shows a further exemplary current profile over time.

FIG. 5 shows a further detail of an exemplary current profile over time.

The decaying current when the supply voltage is switched off is shown. At point P5, the current and the resulting magnetic force is so low that the spring begins to move the armature from the actuating position to the starting position. In the process, a voltage is induced, which again results in an increase in current, but due to the principle of conservation of energy and/or other effects does not again lead to a reverse movement of the sliding element. At point P6, the other end position has been reached and the current decays again "normally". This current profile can be compared with a stored inductance characteristic curve. If, in this example, point P6 corresponds to the expected profile, it can then be assumed that the actuating unit 10 is functioning properly.

For example, in the event of a mechanism of the actuating unit 10 being jammed, in the case of which the sliding element 50 cannot be moved back to the starting position by the spring force, points P5 and P6 would not be apparent since no corresponding change in inductance occurs owing to the lack of movement of the sliding element 50. In this case, a corresponding fault message can be issued by the controller 60.

Figure 6:
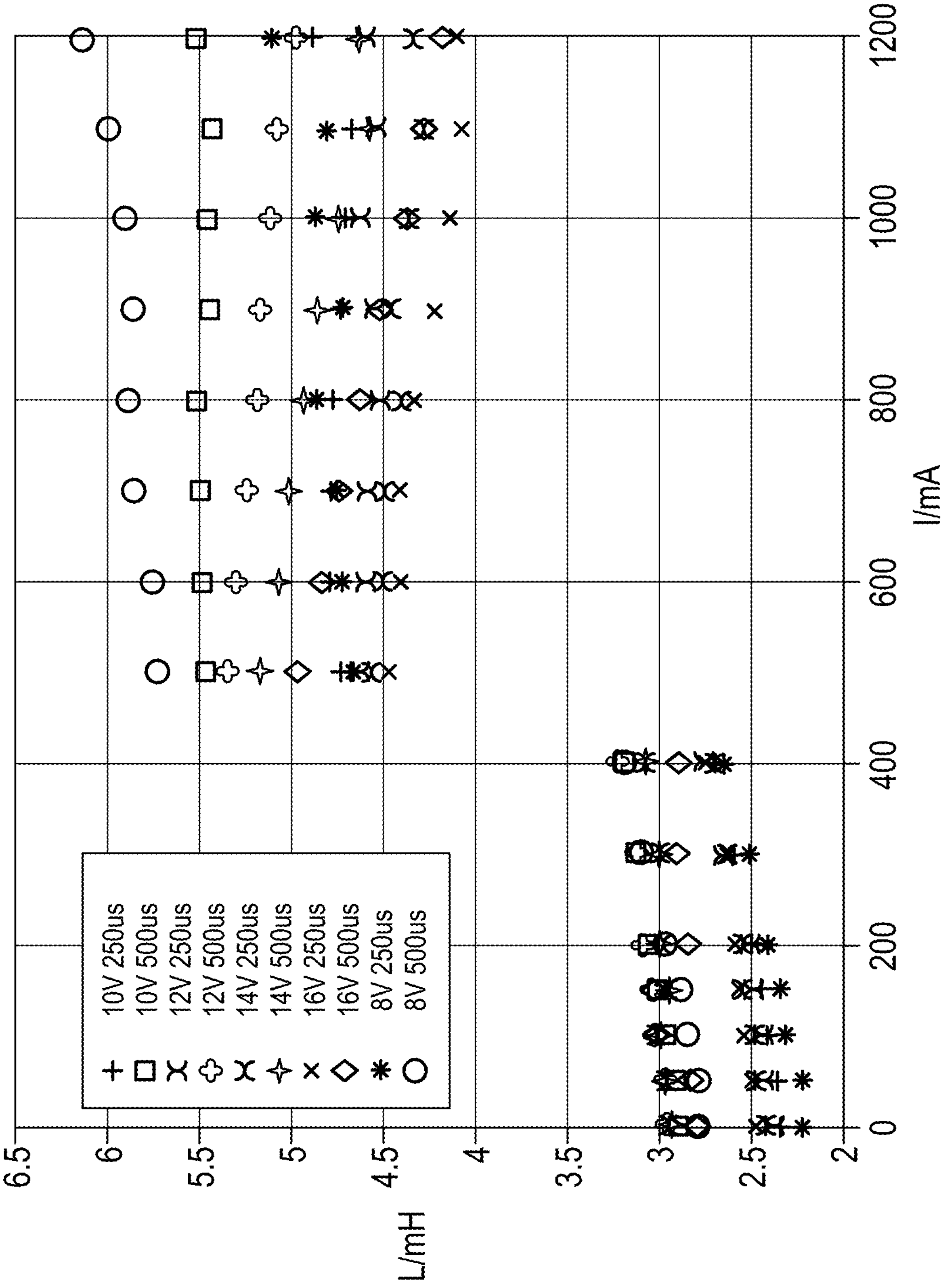
FIG. 6 shows a graphical representation of the inductance found for various parameters of starting current, supply voltage and pulse length.

Finally, FIG. 6 shows a graphical representation of the inductance found for various parameters of current level or starting current, supply voltage and pulse length. Two clusters can be identified for the two end positions, that is to say the starting position and the actuating position of the sliding element 50. It is clear from this that the inductance is different in the two end positions and it can be inferred from the inductance that the corresponding end position of the sliding element 50 has been reached.

The invention claimed is:

1. A method for checking the functionality of an actuating unit comprising:

moving a sliding element of the actuating unit from a first starting position to a second actuating position by switching on a supply voltage for applying a predetermined current level to a electromagnet, comprising at least the following steps:

applying a current level corresponding at least to a magnitude of a holding current to an electromagnet, gradually changing the holding current, detecting the current flowing through the electromagnet during and/or after the change in the holding current, deriving the inductance from the change in the current profile, and comparing the inductance with an inductance characteristic curve stored in a non-volatile memory.

2. The checking method as claimed in claim 1, further comprising when the sliding element is in the starting position:

moving the sliding element from the starting position to the actuating position beforehand, wherein electric current of a current level corresponding at least to the magnitude of an activation current and the magnitude of the holding current is applied to the electromagnet.

3. The checking method as claimed in claim 1, further comprising:

issuing a fault message if the derived magnitude for the inductance deviates from the stored inductance curve by a predetermined value to a controller.

4. The checking method as claimed in claim 1, further comprising:

changing the holding current, detecting the current, deriving the inductance; and comparing the inductance represent a checking cycle, wherein this checking cycle is run through several times and the holding current is changed with each run.

5. The checking method as claimed in claim 1, wherein changing the holding current further comprises brief stopping of the holding current at the specific current level, wherein the supply voltage is switched off for the duration of a test pulse.

6. The checking method as claimed in claim 5, wherein in a subsequent checking cycle, the number of test pulses with stopping of the supply voltage is increased compared to the number of test pulses in the previous checking cycle.

7. The checking method as claimed in claim 1, wherein changing the holding current further comprises gradually reducing the holding current, so that the current level in the subsequent checking cycle is lower than in the previous checking cycle.

8. The checking method as claimed in claim 1, wherein the sliding element can be held in the starting position by the spring, wherein the spring is relaxed, and/or in that the spring is tensioned in the actuating position.

9. The checking method as claimed in claim 1, wherein the sliding element is moved in a translational manner from the starting position to the actuating position.

10. The checking method as claimed in claim 1, wherein the sliding element comprises a blocking slide.

11. The checking method as claimed in claim 1, wherein the sliding element engages into a structured surface on a shaft or into a ratchet wheel, which is connected to the shaft for conjoint rotation, in the actuating position.

12. A method for operating an actuating unit comprising;
- checking a functionality of the actuating unit before actuation comprising;
  - moving a sliding element of the actuating unit from a first starting position to a second actuating position by switching on a supply voltage for applying a predetermined current level to a electromagnet;
  - comprising at least the following steps:
    - applying a current level corresponding at least to a magnitude of a holding current to an electromagnet;
    - gradually changing the holding current;
    - detecting the current flowing through the electromagnet during and/or after the change in the holding current;
  - deriving the inductance from the change in the current profile, and
  - comparing the inductance with an inductance characteristic curve stored in a non-volatile memory;
- wherein the functionality of the actuating unit is checked at least once at the beginning of operation of the actuating unit.

13. The method for operating an actuating unit as claimed in claim 12, wherein the actuating unit comprises a sliding element, which can engage into a structured surface on a shaft or into a ratchet wheel, which is connected to the shaft for conjoint rotation, in an actuating position.

14. An actuating unit, comprising
- a sliding element,
- an electromagnet and
- a spring,
- wherein the sliding element is moveable from a first starting position to a second actuating position by switching on a supply voltage of the electromagnet, as a result of which electric current of a predetermined current level is applied to the electromagnet for carrying out the steps of:
  - moving the sliding element of the actuating unit from the first starting position to the second actuating position by switching on a supply voltage
  - applying the current level corresponding at least to a magnitude of a holding current to the electromagnet,
  - gradually changing the holding current,
  - detecting the current flowing through the electromagnet during and/or after the change in the holding current,
  - deriving the inductance from the change in the current profile, and
  - comparing the inductance with an inductance characteristic curve stored in a non-volatile memory.

15. The actuating unit of claim 14, wherein the actuating unit is integrated into a parking brake or a parking brake unit for at least one electromechanically actuated wheel brake for a motor vehicle.

* * * * *